(12) United States Patent
Takahashi et al.

(10) Patent No.: US 7,243,569 B2
(45) Date of Patent: Jul. 17, 2007

(54) POWER TRANSMISSION DEVICE, ELECTRIC POWER STEERING DEVICE, AND METHOD OF PRODUCING THE SAME

(75) Inventors: Masashi Takahashi, Shimosuwa-machi (JP); Nobuharu Naruse, Tokyo (JP)

(73) Assignee: Kabaya Industry Co., Ltd., Tokyo (JP)

( * ) Notice: Subject to any disclaimer, the term of this patent is extended or adjusted under 35 U.S.C. 154(b) by 492 days.

(21) Appl. No.: 10/469,397

(22) PCT Filed: Sep. 30, 2002

(86) PCT No.: PCT/JP02/10196

§ 371 (c)(1),
(2), (4) Date: Aug. 28, 2003

(87) PCT Pub. No.: WO03/031842

PCT Pub. Date: Apr. 17, 2003

(65) Prior Publication Data

US 2004/0065163 A1      Apr. 8, 2004

(30) Foreign Application Priority Data

Oct. 2, 2001     (JP) .............................. 2001-306656

(51) Int. Cl.
*F16H 35/00* (2006.01)

(52) U.S. Cl. ..................................... 74/388 PS; 74/425
(58) Field of Classification Search ............. 74/388 PS, 74/425, 458, 409
See application file for complete search history.

(56) References Cited

U.S. PATENT DOCUMENTS 5,186,068 A * 2/1993 Heller .......................... 74/425

(Continued)

FOREIGN PATENT DOCUMENTS

DE         198 31 739 A1     1/2000

(Continued)

OTHER PUBLICATIONS

Patent Abstracts of Japan, publication No. 2001-206230, publication date Jul. 31, 2001 (1 page).

(Continued)

*Primary Examiner*—David M. Fenstermacher
(74) *Attorney, Agent, or Firm*—Osha Liang LLP (57) ABSTRACT

In order to achieve low cost, small size, and light weight, to improve response at the time of transmission of power, and to prevent the occurrence of unusual noise, a power transmission device (10) of an electric power steering device (1) has a motor section (5) comprising a rotational shaft (7), a rotor (51) attached to an inner end side (7a) of the rotational shaft (7), and a stator (52) positioned opposite to the rotor (51), a worm gear (61) attached to a distal end side (7b) from the motor section (5) on the rotational shaft (7), and a worm wheel gear (62) engaged with the gear (61). The rotational shaft (7) is rotatably supported by first and second bearings (81, 82), the first bearing (81) being held by a housing (4) at a distal end side (7b) to the worm gear (61). The second bearing (82) is held by the housing (4) between the worm gear (61) and the rotor (51) so that the worm gear (61) is sandwiched between the first and second bearings (81, 82).

11 Claims, 7 Drawing Sheets

U.S. PATENT DOCUMENTS

| | | | | |
|---|---|---|---|---|
| 5,605,071 | A | * | 2/1997 | Buchanan, Jr. ............... 74/425 |
| 6,044,723 | A | * | 4/2000 | Eda et al. ................ 74/388 PS |
| 6,194,849 | B1 | | 2/2001 | Wilson-Jones et al. ........ 318/15 |
| 6,211,631 | B1 | | 4/2001 | Wilson-Jones et al. ........ 318/12 |
| 6,763,738 | B1 | * | 7/2004 | Tsutsui et al. ........... 74/388 PS |

FOREIGN PATENT DOCUMENTS

| | | |
|---|---|---|
| EP | 0 857 135 B1 | 8/1998 |
| EP | 0 975 083 A2 | 1/2000 |
| JP | 2-106657 | 8/1990 |
| JP | 3-42497 | 2/1991 |
| JP | 8-19204 | 1/1996 |
| JP | 9-49552 | 2/1997 |
| JP | 10-001058 | 1/1998 |
| JP | 11-341739 | 12/1999 |
| JP | 2000-50571 | 2/2000 |
| JP | 2001-037159 | 2/2001 |
| JP | 2001-37159 | 2/2001 |
| JP | 2001-206230 | 7/2001 |
| WO | WO 98/10971 | 3/1998 |

OTHER PUBLICATIONS

Patent Abstracts of Japan, publication No. 2000-050571, publication date Feb. 18, 2000 (1 page).

Patent Abstracts of Japan, publication No. 2001-037159, publication date Feb. 9, 2001 (1 page).

Patent Abstracts of Japan, publication No. 03-042497, publication date Feb. 22, 1991 (1 page).

Patent Abstracts of Japan, publication No. 08-019204, publication date Jan. 19, 1996 (1 page).

Patent Abstracts of Japan, publication No. 09-049552, publication date Feb. 18, 1997 (1 page).

Japanese offical action with partial translation; date of dispatch Aug. 3, 2006; Patent application No. 2001-306656 (7 pages).

Chinese office action with translation; Application No. 02805505.5 (12 pages).

Patent Abstracts of Japan; Publication No. 2001-206230; Date of Publication: Jul. 31, 2001 (1 page).

Patent Abstracts of Japan; Publication No. 11-341739; Date of publication: Dec. 10, 1999 (1 page).

Patent Abstracts of Japan; Publication No. 10-001058; Date of publication: Jan. 6, 1998 (1 page).

Patent Abstracts of Japan; Publication No. 2001-037159; Date of publication: Feb. 9, 2001 (1 page).

* cited by examiner

ST1
Worm wheel gear assembling step (B)

ST2´
Worm gear assembling step
ST2″
Rotational shaft assembling step (C)

ST3
Engagement inspecting step

ST4
Rotor assembling step (B)

ST5
Stator assembling preparing step (C)

ST6´
Stator assembling step
ST6″
Motor section inspecting step

ST7
Resolver assembling step (B)

ST8
Resolver phase adjusting step

POWER TRANSMISSION DEVICE, ELECTRIC POWER STEERING DEVICE, AND METHOD OF PRODUCING THE SAME

TECHNICAL FIELD

The present invention relates to a power transmission device for transmitting rotary driving force of a motor via gears, an electric power steering device having the power transmission device used for assisting steering drive, and a method of manufacturing these devices.

BACKGROUND ART

When a steering wheel of an automobile is operated, a steering shaft is rotated, and rotation of this steering shaft is converted to a reciprocating motion and changes the directions of wheels. An electric power steering device for assisting such a steering operation by using driving force of a motor is disclosed in, for example, JP-A 2001-206230.

Figure 7:
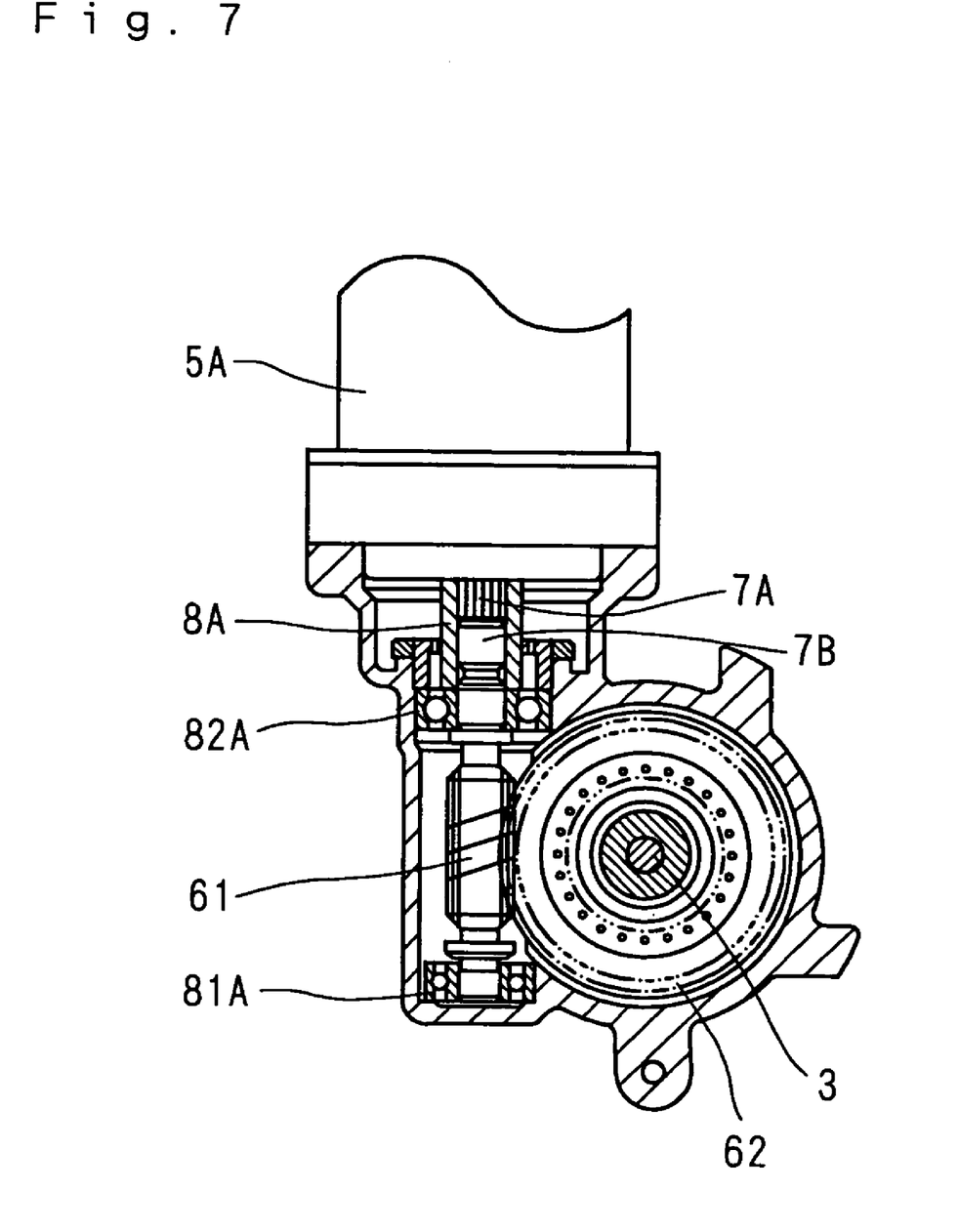
FIG. 7 is a sectional view showing a power transmission device used for a conventional electric power steering device.

In such an electric power steering device, as shown in FIG. 7, a reduction device for transmitting the rotary driving force of a motor has a motor 5A, a rotational shaft 7B connected to an output shaft 7A of the motor 5A via a coupling sleeve 8A, a worm gear 61 fixed on the rotational shaft 7B, and a worm wheel gear 62 engaged with the worm gear 61. The worm wheel gear 62 is fixed on a steering shaft 3 or a shaft connected to the steering shaft 3. Here, the output shaft 7A is supported by two bearings (not shown) in the motor 5A, and the rotational shaft 7B is rotatably supported by a first bearing 81A and a second bearing 82A on either end of the worm gear 61.

Therefore, when a steering wheel is operated by a driver, if the operation is detected by a torque sensor (not shown), the motor 5A is started, and the rotary driving force of the motor 5A is reduced and transmitted to the steering wheel 3 via the output shaft 7A, the rotational shaft 7B, the worm gear 61, and the worm wheel 62 so as to assist the steering operation.

However, in the conventional electric power steering device, the rotational shaft 7B is connected to the output shaft 7A of the motor 5A, which has been assembled as a completed product, via the coupling sleeve 8A. Hence, it is necessary to support the output shaft 7A by using the two bearings in the motor 5A and to support the rotational shaft 7B by using the two bearings 81A and 82A, so that no less than four bearings are necessary in total. Thus, regarding the conventional electric power steering device, the number of components is large, the cost is high, and the device is larger and heavier. Additionally, since the device has a large number of bearings, the rotation of the steering shaft 3 requires a strong force, resulting in poor steering feel. Furthermore, in the conventional electric power steering device, the output shaft 7A of the motor 5A and the rotational shaft 7B of the worm gear 61 are connected by spline grooves via the coupling sleeve 8A. As spline machining is necessary, the cost is increased. Additionally, when a rattle occurs on a connected part of the spline grooves, an unusual noise appears when the motor 5A is rotated, and the response of the worm gear 61 to the rotation of the motor 5A is degraded.

In view of the above problems, the present invention has as its object the provision of a power transmission device, an electric power steering device, and a method of manufacturing the devices whereby a lower cost, a smaller size, a reduced weight, and improvement in response at the transmission of power are achieved by reducing the number of bearings, and unusual noise can be also prevented.

DISCLOSURE OF THE INVENTION

A power transmission device of the present invention comprises a motor section having a rotational shaft, a rotor fixed on the inner end side of the rotational shaft, and a stator positioned opposite to the rotor, a driving gear fixed on the rotational shaft at the distal end side from the motor section, a driven gear engaged with the driving gear, a driven-side bearing for rotatably supporting the driven gear, and a fixed-side member for holding the driven-side bearing, wherein the rotational shaft is rotatably supported by a first bearing and a second bearing, the first bearing being held by the fixed-side member on the distal end side from the driving gear, the second bearing being held by the fixed-side member between the driving gear and the rotor so that the driving gear is sandwiched between the first bearing and the second bearing.

The present invention employs the motor section comprising the rotational shaft, the rotor fixed on the inner end side of the rotational shaft, and the stator positioned opposite to the rotor. A motor as a completed product is not used. Therefore, while the conventional art needs to connect the output shaft of the motor and the rotational shaft having the driving gear fixed thereon by spline machining and so on, the present invention only requires a single rotational shaft. Thus, it is not necessary to connect shafts by using spline machining and so on. It is therefore possible to reduce the number of components and the manufacturing cost. Moreover, since only the single rotational shaft is necessary, only the two bearings are required. As a result, the number of components and the manufacturing cost can be reduced and the device can have a smaller size and a lighter weight. Additionally, since the shafts are not connected using spline machining, problems caused by rattling resulting from spline grooves on a connected part, for example, unusual noise and a reduction in response of a worm gear to the rotation of the motor, do not occur. Further, as the number of bearings is smaller, force required for rotating the steering shaft is reduced, thereby improving the steering feel. Furthermore, since the rotational shaft is supported by the two bearings on both sides of the driving gear, even when the bearings are displaced, it is possible to minimize the inclination of the rotational shaft. Therefore, the efficiency of transmitting power from the driving gear to the driven gear does not decrease.

Moreover, since the power transmission device applying the present invention has the above configuration, the following manufacturing method is applicable. The method of manufacturing the power transmission device of the present invention comprises a driving gear assembling step of mounting the driving gear on the rotational shaft, a rotational shaft assembling step of engaging the driving gear with the driven gear held by the fixed-side member via the driven-side bearing, supporting the distal end side of the rotational shaft on the fixed-side member via the first bearing, and supporting the inner end side of the rotational shaft on the fixed-side member via the second bearing, a rotor assembling step of fixing the rotor on the inner end side of the rotational shaft, and a stator assembling step of fixing the stator on the fixed-side member opposite to the rotor so as to constitute the motor section.

In this case, a radial bearing such as a ball bearing can be used as the first bearing and the second bearing.

Therefore, in a state in which the rotational shaft assembling step is performed, the first bearing and the second bearing for supporting the rotational shaft have already been fixed on the common fixed-side member, thereby accurately performing a step of inspecting engagement. Further, since the step of inspecting engagement can be performed before the rotor assembling step, if a problem occurs with the driving gear or the driven gear, a gear having a problem can be replaced easily. Particularly, when the power transmission device is used for the electric power steering device, a worm wheel gear attached to the side of the steering shaft is used as the driven gear and a worm gear is used as the driving gear. In this case, since engagement requires high accuracy, it is more likely that gears will exhibit problems. However, according to the present invention, the worm wheel gear or the worm gear can be replaced easily, thereby readily solving a problem in engagement. Further, in the case of the electric power steering device, even if a problem is found with the worm wheel gear or the worm gear after the device is assembled, disassembly cannot be performed easily. However, in the present invention, the step of inspecting engagement is performed and a problem with engagement can be solved before the rotor assembling step, so that the electric power steering device can be improved in yield.

Additionally, after the stator assembling step, the motor section is driven and a motor section inspecting step can be performed to inspect the motor section. When the motor section is inspected at such a time, a problem with an engaged part can be solved in advance. Hence, in the event of a problem in this step, it is possible to readily specify that the problem lies in the motor section.

Additionally, when the motor has a brushless structure, a movable member for detecting rotation is mounted on the distal end side from the first bearing on the rotational shaft, and a detector for detecting the rotation of the movable member for detecting rotation is attached to the fixed-side member. In such a configuration, according to the present invention, after the stator assembling step, while a movable member of a rotation detecting device is assembled to the distal end side from the first bearing on the rotational shaft, the detector for detecting the rotation of the movable member is attached to the fixed-side member. In this state, the step of assembling the rotation detecting device can be performed to adjust a phase of the rotation detecting device. When the position is adjusted at such a time, since the inspections of the engaged part and the motor section have been completed in the previous step, problems with the engaged part and the motor section are not found after the position is adjusted. For this reason, it is possible to eliminate the necessity for disassembling in the event of a problem after assembling has been performed.

Such a power transmission device can be used, for example, for an electric power steering device. In this case, the driven gear is a worm wheel gear attached to the side of the steering shaft, the driving gear is a worm gear engaged with the worm wheel gear, and the motor section is used for assisting steering drive, the motor assisting the rotation of the steering shaft by driving to rotate the worm wheel gear via the worm gear. With such a device, particularly high reliability is required. According to the present invention, it is possible to perform inspections at the most appropriate timing according to the progress of the assembly, thereby manufacturing an electric power steering device with high reliability.

In the present invention, the fixed-side member may be a housing for covering at least the worm wheel gear and the worm gear.

In the present invention, a motor case for covering the rotor and the stator may be connected to the housing.

Moreover, the housing may comprise a cylindrical part for covering the rotor and the stator, and an opening of the cylindrical part may be covered with a lid.

BEST MODE FOR CARRYING OUT THE INVENTION

An example of an electric power steering device according to the present invention and a method of manufacturing the same will be described with reference to the drawings.

(Electric Power Steering Device)

FIGS. 1(A), 1(B), and 1(C) are explanatory views of the electric power steering device employing the present invention. FIG. 2 is a sectional view showing a power transmission device used for the electric power steering device of the present invention.

As shown in FIG. 1(A), with respect to the steering of an automobile, an operation of a steering wheel 20 is transmitted to wheels 21 via a steering shaft 3. In recent years, in order to assist the operation, a power transmission device 10 having a reduction device and an auxiliary motor, which will be discussed later, have been provided in a steering column just like an electric power steering device 1 shown in FIG. 1(B). Further, like an electric power steering device 1 of FIG. 1(C), a power transmission device 10 having a reduction device and an auxiliary motor, which will be described later, may be provided around a pinion shaft of a steering gear 22. In such an electric power steering device 1, a steering operation by a driver is detected by a torque sensor (not shown), and the auxiliary motor and the reduction device of the power transmission device 10 promptly generate optimum assist force by calculation performed at a control unit (not shown), thereby achieving comfortable steering feel.

As shown in FIG. 2, the power transmission device 10 used for the electric power steering device 1 of the present embodiment has a housing 4 (fixed-side member), through which the steering shaft 3 or a shaft connected to the steering shaft 3 passes.

In the power transmission device 10, the housing 4 comprises a first cylindrical part 4a for permitting the steering shaft 3 or a shaft connected to the steering shaft 3 to penetrate vertically, and a second cylindrical part 4b which intersects the first cylindrical part 4a and extends laterally.

A worm wheel gear 62 (driven gear) attached to the steering shaft 3 is placed on the first cylindrical part 4a, namely a central rotational shaft of the worm gear 62 or the steering shaft 3 is supported by the housing 4 via a driven-side bearing (not shown), so that the worm gear 62 can rotate integrally with the steering shaft 3.

Further, the second cylindrical part 4b has openings on both ends. A stator case 53 (motor case) is fixed on one of the openings by a bolt 41 via an O ring 42, and a lid 44 is attached to cover the other opening.

In a space surrounded by the second cylindrical part 4b and the stator case 53, a motor section 5 is constituted by a rotational shaft 7, a rotor 51 attached to an inner end side 7a of the rotational shaft 7, and a stator 52 opposed to the rotor 51.

In the motor section 5, the stator 52 is fixed on the inner circumferential surface of the stator case 53. The stator 52 comprises a core 52b, a winding 52a wound around the core 52b, an insulator 52c for insulating the outer peripheral side of the winding 52a, and a power connector 52d for supplying power to the winding 52a. The power connector 52d is also attached to the stator case 53. Meanwhile, the rotor 51 comprises a yoke 51a which is a part fitted into the rotational shaft 7, a magnet 51b attached to the outer periphery of the yoke 51a, a magnet protector 51c for protecting the outer periphery of the magnet 51b, and a nut 51d for fixing the yoke 51a on the rotational shaft 7.

Further, to a distal end side 7b from the motor 51 on the rotational shaft 7, a worm gear 61 (driving gear) engaged with the worm wheel gear 62 is attached. The worm gear 61 and the worm wheel gear 62 constitute a speed reduction mechanism.

Here, the rotational shaft 7 is rotatably supported by a first bearing 81, which is a ball bearing held by the second cylindrical part 4b at the distal end side 7b from the worm gear 61, and a second bearing 82, which is a ball bearing held by the housing 4 between the worm gear 61 and the rotor 51 so that the worm gear 61 is sandwiched between the first bearing 81 and the second bearing 82.

Since the motor 5 has a brushless motor structure, a rotation detector is necessary for controlling electrical feed to the motor. Thus, in the present embodiment, a resolver 9 is used as a rotation detector. The resolver 9 is placed on the distal end side 7b of the rotational shaft 7. Namely, the resolver 9 has a resolver rotor 9a (movable member) fitted into the rotational shaft 7, a nut 9b for fixing the resolver rotor 9a on the rotational shaft 7, a resolver stator 9c (detector) positioned opposite to the outer peripheral surface of the resolver rotor 9a, and a resolver connector 9d connected to the resolver stator 9c. The resolver stator 9c is pressed and fixed on the inside of the second cylindrical part 4b of the housing 4 by a stator retainer 9e, which is screwed from the opening opposite to the side where the motor section 5 is assembled. Further, a resolver connector 9d is also attached to the second cylindrical part 4b.

In the resolver 9 thus configured, the position of the resolver rotor 9a is changed according to the rotation of the rotational shaft 7. Thus, the positional change is detected by the resolver stator 9c as a change in impedance and the rotational position of the rotational shaft 7 is detected.

Figure 1:
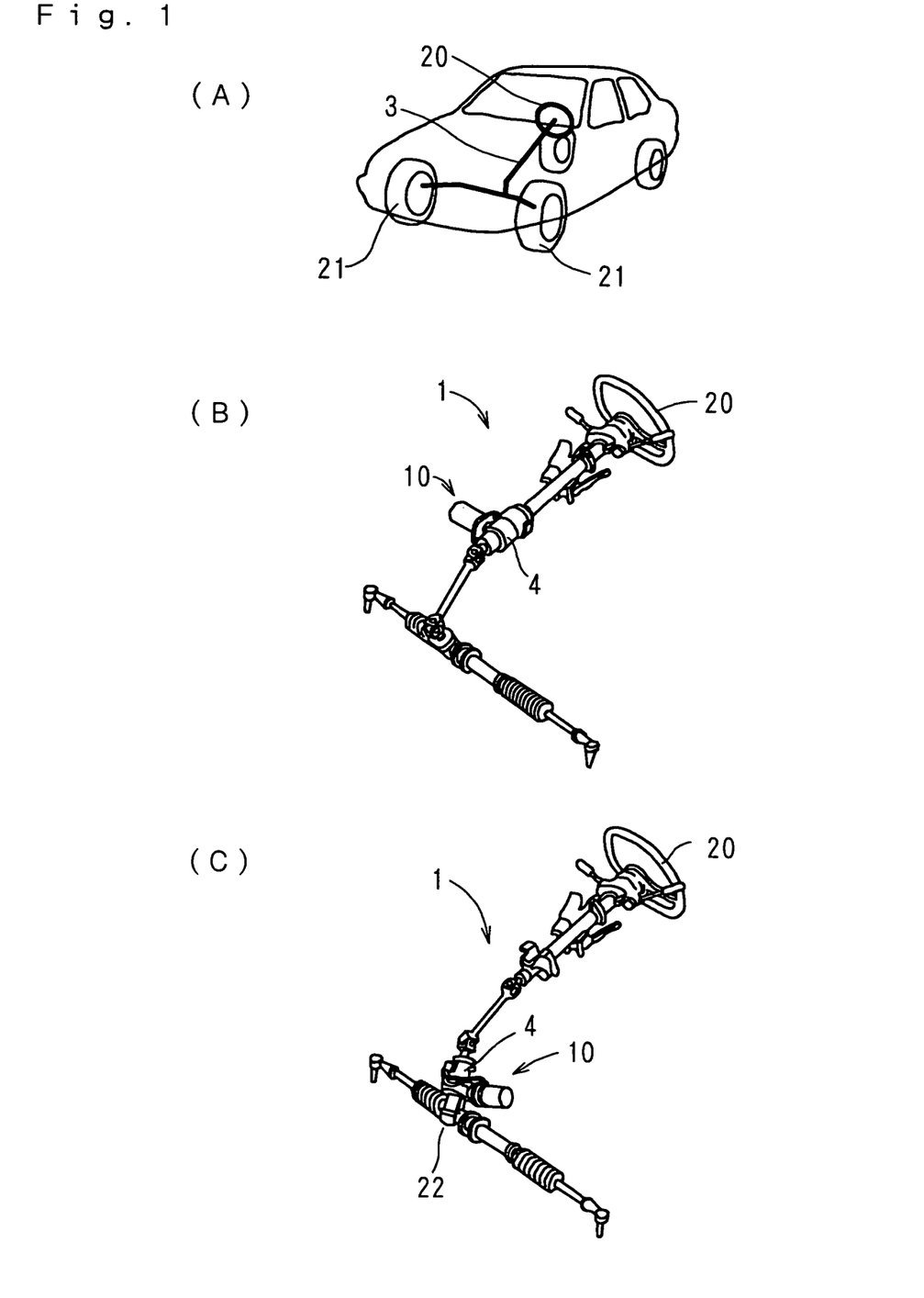
FIGS. 1(A), 1(B), and 1(C) are explanatory views showing an electric power steering device, to which the present invention is applied.
Figure 2:
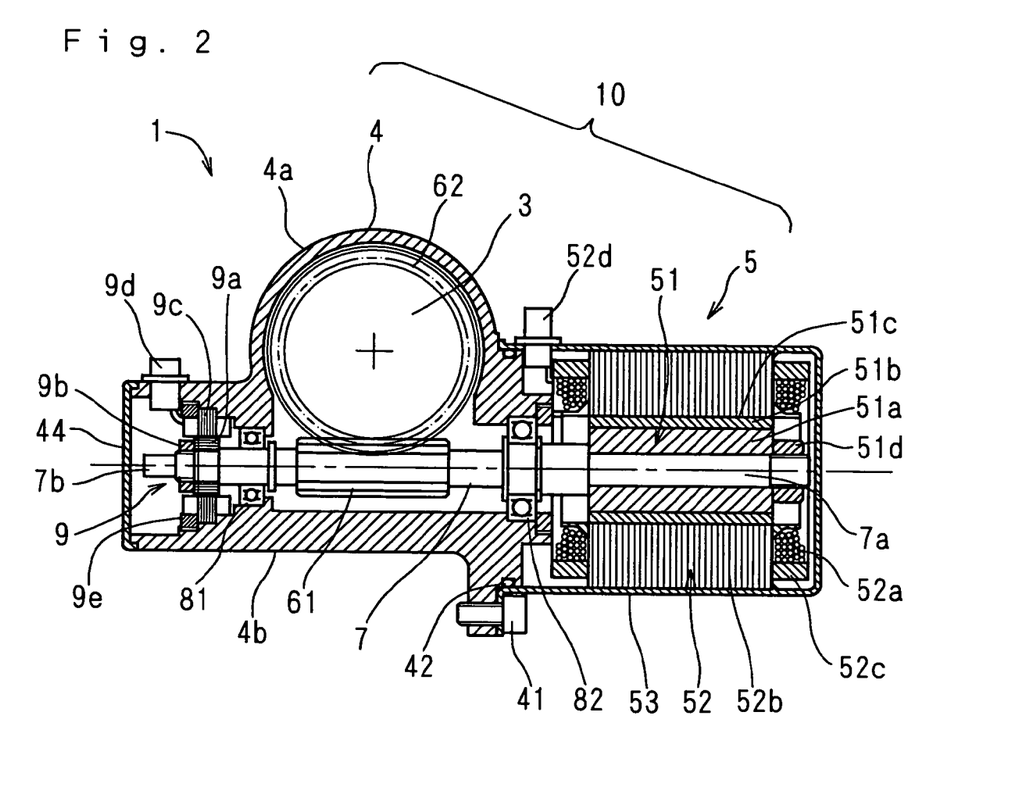
FIG. 2 is a sectional view showing a power transmission device used for the electric power steering device of the present invention.

In the electric power steering device 1 which has the power transmission device 10 thus configured, when the steering wheel 20 of FIG. 1 is operated, the operation is detected by a torque sensor (not shown) and the detection result is calculated by a control unit (not shown) to control electrical feed to the winding 52a of the motor section 5. As a result, the rotational shaft 7 rotates at a predetermined speed and thus the worm gear 61 rotates integrally with the rotational shaft 7. Therefore, the worm wheel gear 62 engaged with the worm gear 61 rotates integrally with the steering shaft 3.

In this way, the rotation of the rotational shaft 7 in the motor section 5 is reduced in speed and transmitted to the steering shaft 3 via the worm gear 61 and the worm wheel gear 62, thereby assisting the operation of the steering wheel 20. Here, since the motor 5 has a brushless motor structure, the winding 52a is fed via the resolver 9 based on the detection result of the rotational position of the rotational shaft 7.

(Method of Manufacturing the Electric Power Steering Device)

Figure 3:
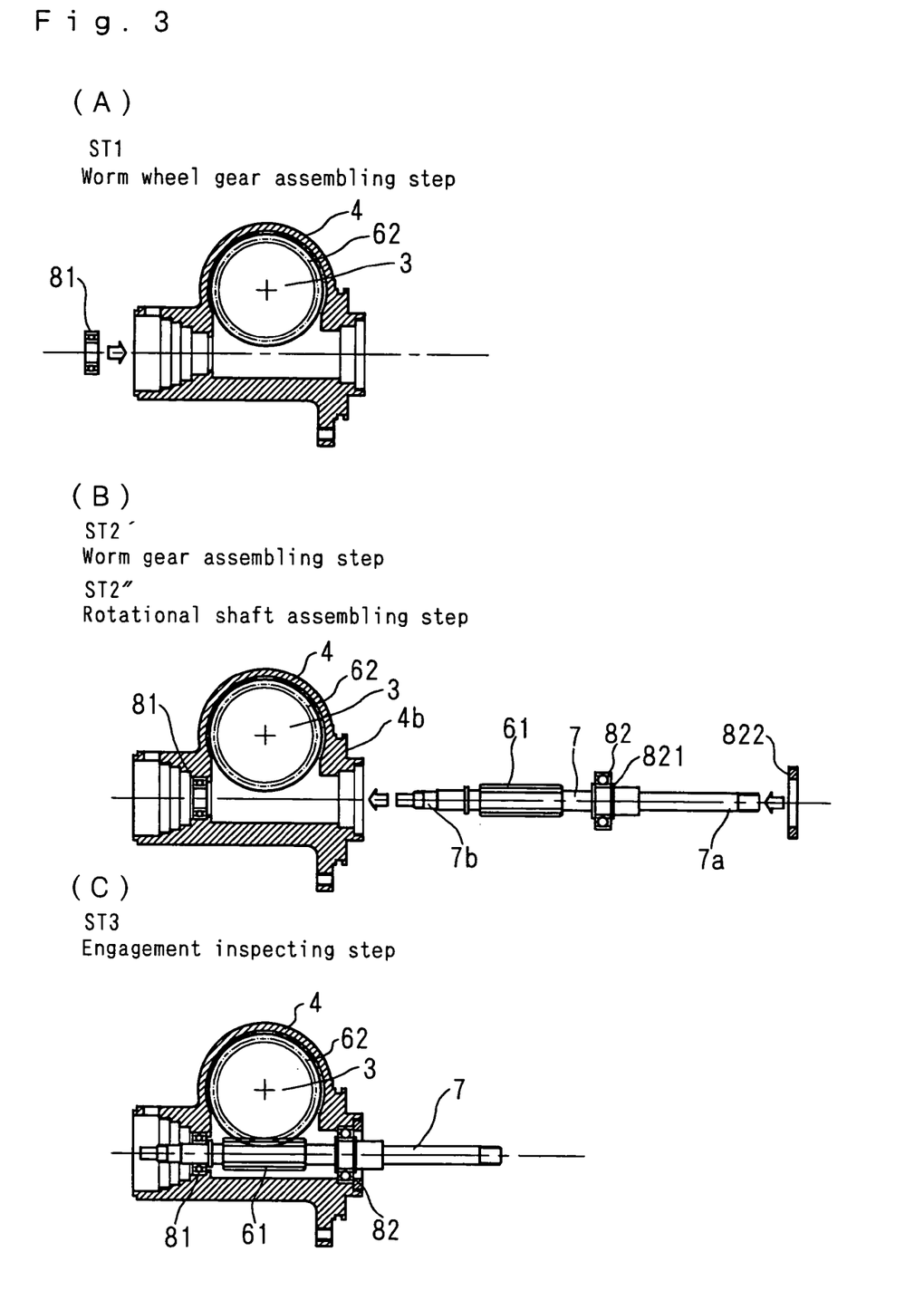
FIG. 3 is an explanatory view showing steps of manufacturing the power transmission device used for the electric power steering device of FIG. 2.
Figure 4:
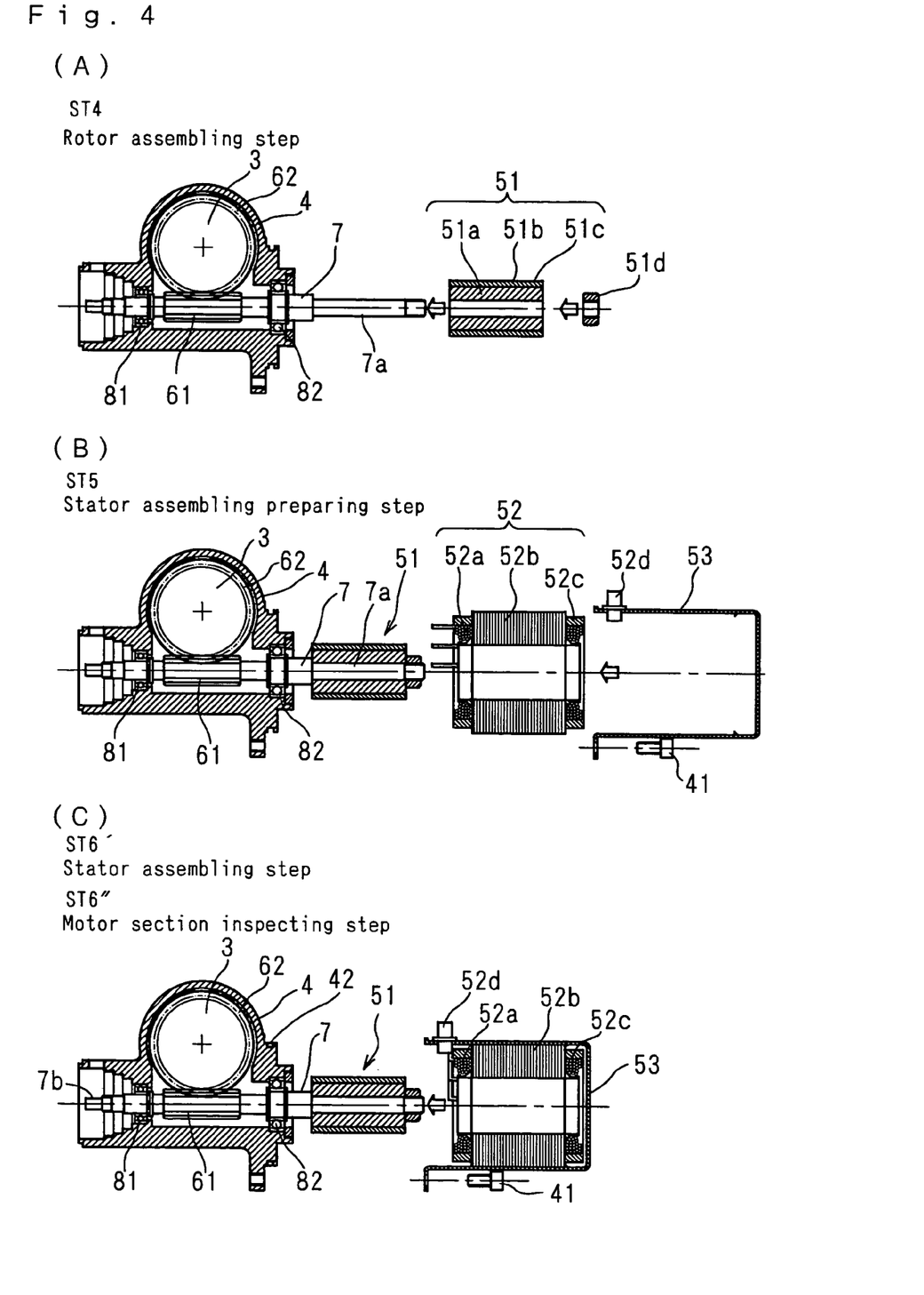
FIG. 4 is an explanatory view showing steps of manufacturing the power transmission device used for the electric power steering device of FIG. 2.
Figure 5:
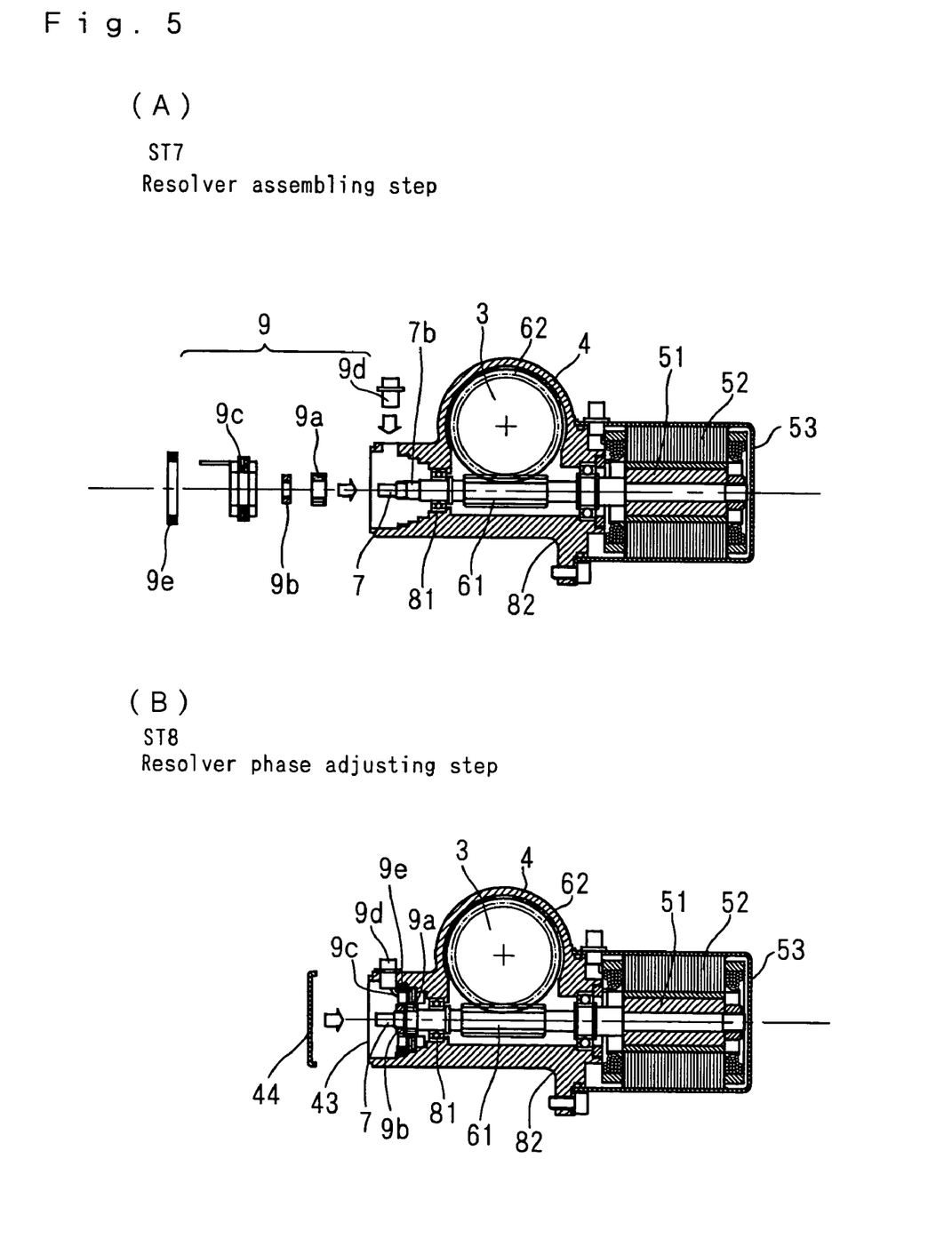
FIG. 5 is an explanatory view showing steps of manufacturing the power transmission device used for the electric power steering device of FIG. 2.

A method of manufacturing the electric power steering device 1 according to the present example will be discussed in the following. Regarding the steps of manufacturing the electric power steering device 1 of the present example, FIGS. 3 to 5 are explanatory views of the steps of manufacturing the power transmission mechanism 10 used for the electric power steering device 1.

First, in step ST1 of assembling the worm wheel gear shown in FIG. 3(A), the worm wheel gear 62 attached to the steering shaft 3 is set in the housing 4. Next, the outer ring of the first bearing 81 is attached to the housing 4 by press-fitting.

Next, in step ST2' of assembling the worm gear shown in FIG. 3(B), the worm gear 61 is assembled on the rotational shaft 7 (driving gear assembling step).

Next, in step ST2" of assembling the rotational shaft, a round ring 821 is circumferentially caulked on the rotational shaft 7 from the outer circumferential side to fix on the rotational shaft 7, and the second bearing 82 is fixed by press-fitting at a position adjacent to the inner end side 7a with respect to the worm gear 61 on the rotational shaft 7. Subsequently, the rotational shaft 7 is passed through an inner ring of the first bearing 81, which is attached to the housing 4, from the distal end side 7b. Thereafter, a bearing outer ring retainer 822 threaded on the outer circumferential surface is passed from the inner end side 7a of the rotational shaft 7, and the bearing outer ring retainer 822 is screwed into the second cylindrical part 4b. As a result, the rotational shaft 7 is rotatably supported by the first bearing 81 and the second bearing 82 that are mounted on the housing 4.

Next, in step ST3 of inspecting engagement of the worm gear shown in FIG. 3(C), the rotational shaft 7 is rotated slightly to inspect the engagement between the worm gear 61 and the worm wheel gear 62.

Subsequently, in step ST4 of assembling the rotor shown in FIG. 4(A), the rotor 51 is assembled on the rotational shaft 7 from its inner end side 7a, and is fastened by the nut 51d, whereby the rotor 51 is fixedly assembled at a position adjacent to the inner end side 7a of the rotational shaft 7 with respect to the second bearing 82. In this step, an axial rib for locking is formed by a knurling machining on the inner end side 7a of the rotational shaft 7 where the rotor 51 is assembled.

In step ST5 of preparing assembly of the stator shown in FIG. 4(B), after preparation of the core 52b having the winding 52a and the insulator 52c, constituting the stator part 52, attached, the stator case 53 where the power connector 52d is attached, and the bolt 41 for fixing the stator case 53 on the housing case 4, in step ST6' of assembling the stator shown in FIG. 4(C), the core 52b is fixed in the stator case 53 and the winding 52a is connected to the power connector 52d. Subsequently, the stator case 53 where the stator 52 is assembled is mounted to the housing 4 via the O ring 42, and the stator case 53 is fixed by the fixing bolt 41. Subsequently, in step ST6" of inspecting the motor section, the rotational shaft 7 is rotated from the outside by using the distal end side 7b of the rotational shaft 7, and the rotational characteristics of the motor 5 are confirmed.

Next, in step ST7 of assembling the resolver shown in FIG. 5(A), the resolver 9 is attached to the distal end side 7b of the rotational shaft 7. For this attachment, after the resolver rotor 9a is inserted into the distal end side 7b of the rotational shaft 7 where knurling for locking is applied, the resolver rotor 9a is fixed by the nut 9b. Further, the resolver stator 9c and the resolver connector 9d are assembled to the housing 4, and the resolver stator 9c is pressed and fixed by the stator retainer 9e after phase of the resolver is adjusted.

Next, in step ST8 of adjusting phase of the resolver shown in FIG. 5(B), the resolver stator 9c is connected to the resolver connector 9d, the resolver stator 9c is shifted in the rotating direction, and phase is adjusted. After the phase adjustment, the resolver stator 9c is pressed and fixed by the stator retainer 9e, and a circular opening 43 of the housing 4 is closed by the lid 44, so that the electric power steering device 1 of FIG. 1 is completed.

ADVANTAGES OF THE PRESENT EMBODIMENT

As described above, the power transmission device 10 used for the electric power steering device 1 of the present embodiment uses the motor section 5 comprising the rotational shaft 7, the rotor 51 attached to the inner end side 7a of the rotational shaft 7, and the stator 52 opposed to the rotor 51. The power transmission device 10 does not use a motor as a completed product. Therefore, while the conventional art needs to connect the output shaft of the motor and the rotational shaft, on which the worm gear 61 is attached, by spline machining and so on, the present invention only requires the single rotational shaft 7. Thus, it is not necessary to connect shafts by using spline machining and so on. It is therefore possible to reduce the number of components and the manufacturing cost. Moreover, since only the single rotational shaft 7 is used, the rotational shaft 7 can be supported by only the two bearings 81 and 82. This naturally reduces the number of components, the manufacturing cost can be reduced, and the device can be made smaller and lighter in weight. Additionally, since the shafts are not connected using spline machining, problems caused by rattling resulting from spline grooves on a connected part, for example, an unusual noise and a reduction in response of the worm gear 61 to the rotation of the motor, do not occur. Besides, the rotational shaft 7 can be supported by only the two bearings 81 and 82 and the steering shaft 3 rotates lightly as a result of the reduced number of the bearings, thereby improving the steering feel.

Further, since the rotational shaft 7 is supported by the first bearing 81 and the second bearing 82 on both sides of the worm gear 61, even when the bearings 81 and 82 are displaced, it is possible to minimize the inclination of the rotational shaft 7. For this reason, the transmitting efficiency from the worm gear 61 to the worm wheel gear 62 does not decrease.

Moreover, in the present embodiment, when the power transmission device 10 is manufactured, in a state in which step ST2" of assembling the rotational shaft is performed, the first bearing 81 and the second bearing 82 for supporting the rotational shaft 7 are fixed on a common fixed-side member (housing 4). Thus, step ST3 of inspecting engagement can be accurately performed. Moreover, since it is possible to perform step ST3 of inspecting engagement before step ST4 of assembling the rotor is performed, when a problem occurs with the worm gear 61 or the worm wheel gear 62, it is possible to easily replace only a gear having the problem. Particularly when the power transmission device 10 is used for the electric power steering device 1, since the worm wheel gear 62 and the worm gear 61 are used as gears, even a small deviation in accuracy is likely to cause a problem in engagement. According to the present embodiment, even when such a problem occurs, since the worm wheel gear 62 or the worm gear 61 can be readily replaced in the middle of the manufacturing process, the problem can be readily solved.

Moreover, in the case of the electric power steering device 1, even if a problem is found with the worm wheel gear 62 or the worm gear 61 after the electric power steering device 1 is assembled, disassembling cannot be performed easily. However, in the present invention, step ST3 of inspecting engagement is performed to solve a problem of engagement before step ST4 of assembling the rotor, thereby improving yield and reliability of the electric power steering device 1.

Further, after step ST6' of assembling the stator, the motor section 5 is started and step ST6" of inspecting the motor section can be performed to inspect the motor section 5. When the motor section 5 is inspected at such a time, a problem with an engaged part can be solved in advance. Thus, when a problem occurs in this step, it is possible to readily specify that the cause lies in the motor section 5.

Furthermore, since the motor section 5 has a brushless motor structure, after step ST6' of assembling the stator, the resolver rotor 9a (movable member) for detecting rotation is mounted on the distal end side 7a from the first bearing 81 on the rotational shaft 7, the resolver stator 9c for detecting the rotation of the resolver rotor 9a is attached to the housing 4, and step ST7 of assembling the resolver is performed. Thereafter, step ST8 of adjusting phase is performed. When step ST8 of adjusting phase is performed at such a time, inspection of an engaged part and the motor section 5 are completed in the previous step. Hence, problems with an engaged part and the motor section 5 are not found after the phase adjustment. For this reason, it is possible to avoid disassembling after assembling has been performed.

OTHER EMBODIMENTS

Figure 6:
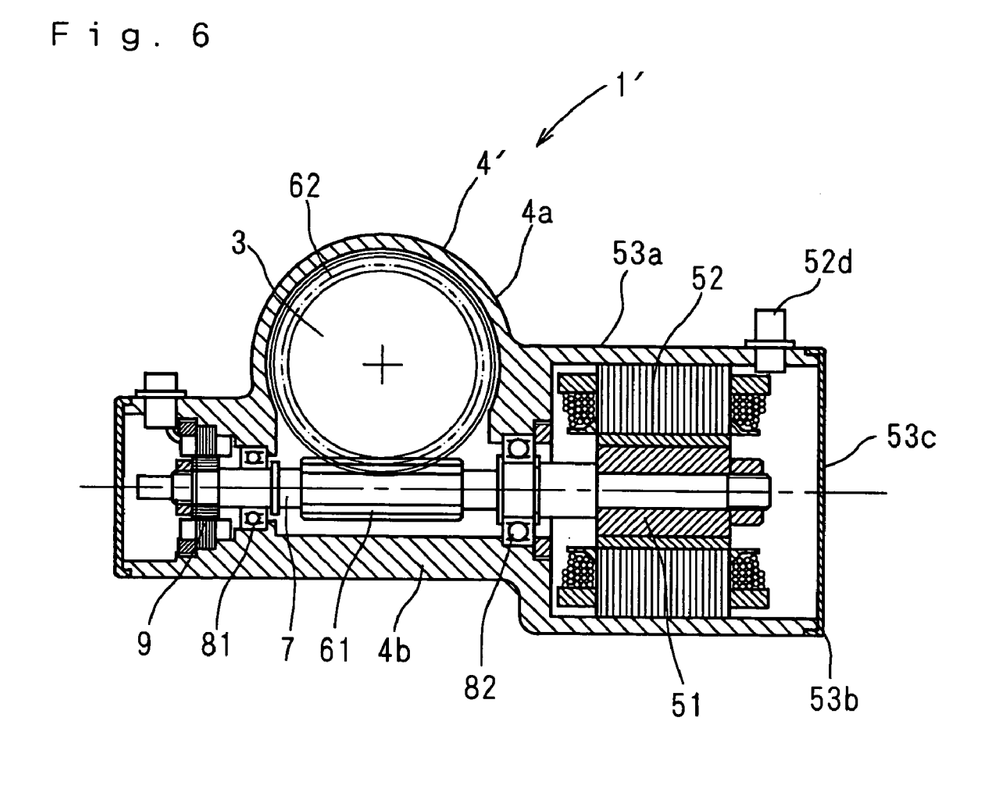
FIG. 6 is a sectional view showing a power transmission device used for another electric power steering device according to the present invention.

In the above electric power steering device 1, the cup-shaped stator case 53 is attached to the housing 4. As shown in FIG. 6, a second cylindrical part 4b of a housing 4' may be extended so as to serve as the stator case 53. Namely, in an electric power steering device 1' of FIG. 6, the second cylindrical part 4b of the housing 4' is extended to constitute a cylindrical stator attaching part 53a for fixing a stator 52. A power connector 52d is attached to the stator attaching part 53a, and a circular end face 53b of the stator attaching part 53a is covered with a lid 53c. In this way, the stator attaching part 53a is integrated with the housing 4', thereby omitting components such as an O ring 42 and a fixing nut that are required for attaching the stator case 53.

The above embodiment described the example in which the power transmission device 10 is used for the electric power steering device 1. The present embodiment may be applied to other devices. Further, since the present embodiment uses the resolver 9 for detecting the rotational position of the rotational shaft 7, like the electric power steering device 1 of FIG. 1(C), even when the power transmission device 10 is placed at a high temperature around a pinion shaft of a steering gear 22, no thermal problems occur. However, like the electric power steering device 1 of FIG. 1(B), when the power transmission device 10 is placed in the steering column, since a temperature does not significantly increase, an optical rotational position detector may be used.

INDUSTRIAL APPLICABILITY

As described above, in a power transmission device of the present invention and an electric power steering device using the power transmission device, since only a single rotational shaft is necessary on a driving side, shafts do not need to be connected using spline machining and so on. Therefore, it is possible to reduce the number of components and the manufacturing cost. Moreover, since the single rotational shaft on the driving side is used, the rotational shaft can be supported by only two bearings. This means that the number of components and the manufacturing cost can be reduced and the device can be made smaller and lighter in weight. Furthermore, since the shafts are not connected using spline machining, a problem caused by rattling does not occur on a connected part of spline grooves. Additionally, as the number of bearings is smaller, force-required for rotating the steering shaft is reduced, thereby improving the steering feel. Further, since the rotational shaft is supported by a first bearing and a second bearing on both sides of a driving gear, it is possible to minimize the inclination of the rotational shaft and prevent a reduction in efficiency of transmitting power through the gear.

Moreover, in a state in which the step of assembling the rotational shaft is performed, the first bearing and the second bearing for supporting the rotational shaft have already been fixed on a shared fixed-side member, thereby accurately performing the step of inspecting engagement. Also, since the step of inspecting engagement can be performed before the step of assembling the rotor, when a problem is found with the driving gear or a driven gear, a gear having a problem can be replaced easily. Additionally, since the motor section can be inspected after the inspection step, when a problem is found in this step, it is possible to readily specify that the cause lies in the motor section.

The invention claimed is:

1. A power transmission device, comprising:
   a motor section having a rotational shaft, a rotor attached to an inner end side of the rotational shaft, and a stator positioned opposite to the rotor;
   a driving gear attached to a distal end side of the rotational shaft with respect to the motor section;
   a driven gear engaged with the driving gear; and
   a fixed-side member for rotatably supporting the driven gear, wherein the rotational shaft is a single member and is rotatably supported by a first bearing and a second bearing,
   the first bearing is held by the fixed-side member at a distal end side of the rotational shaft with respect to the driving gear, and
   the second bearing is held by the fixed-side member between the driving gear and the rotor so that the driving gear is sandwiched between the first bearing and the second bearing, wherein
   the motor section has a brushless motor structure comprising a rotation detecting device for detecting rotation of the rotational shaft provided at a distal end side of the rotational shaft with respect to the first bearing.
   the rotation detecting device has a movable member mounted on the distal end side of the rotational shaft with respect to the first bearing, and a detector for detecting rotation of the movable member mounted on the fixed-side member.
   the fixed-side member is formed with a cylindrical part having a first opening on a first end, and a second opening on a second end,
   the first opening of the cylindrical part is configured to accept the first bearing and the rotation detecting device, and
   the second opening of the cylindrical part is configured to accept the distal end side portion of the rotational shaft and the second bearing.

2. An electric power steering device comprising the power transmission device defined in claim 1, wherein:
   the driven gear is a worm wheel gear attached to a side of the steering shaft,
   the driving gear is a worm gear engaged with the worm wheel gear, and
   the motor section is used for assisting steering drive, the motor section assisting rotation of the steering shaft by driving the worm wheel gear to rotate via the worm gear.

3. The electric power steering device according to claim 2, wherein the fixed-side member is a housing for covering at least the worm wheel gear and the worm gear.

4. The electric power steering device according to claim 3, wherein a motor case for covering the rotor and the stator is connected to the housing.

5. The electric power steering device according to claim 3, wherein the housing comprises a cylindrical part for covering the rotor and the stator, and the cylindrical part has an opening covered with a lid.

6. A method of manufacturing a power transmission device, the power transmission device comprising:
   a motor section having a rotational shaft, a rotor attached to an inner end side of the rotational shaft, and a stator positioned opposite to the rotor,
   a driving gear attached to a distal end side of the rotational shaft with respect to the motor section,
   a driven gear engaged with the driving gear, and
   a fixed-side member for rotatably supporting the driven gear, wherein
   the rotational shaft is a single member and is rotatably supported by a first bearing and a second bearing,
   the first bearing is held by the fixed-side member at a distal end side of the rotational shaft with respect to the driving gear, and
   the second bearing is held by the fixed-side member between the driving gear and the rotor so that the driving gear is sandwiched between the first bearing and the second bearing, and
   the fixed-side member is formed with a cylindrical part having a first opening on a first end, and a second opening on a second end.

the method comprising:
- a step of assembling the first bearing into the cylindrical part of the fixed-side member from the first opening,
- a rotational shaft assembling step of mounting the driving gear and the second bearing on the rotational shaft, and assembling the rotational shaft into the cylindrical part from the second opening so that the drive gear on the rotational shaft is engaged with the driven gear held by the fixed-side member, and the rotational shaft is supported at its distal end side by the fixed-side member via the first bearing and is supported at its inner end side by the fixed-side member via the second bearing.
- an engagement inspecting step of inspecting engagement between the driving gear and the driven gear.
- a rotor assembling step of attaching the rotor to an inner end side of the rotational shaft, and
- a stator assembling step of attaching the stator to the fixed-side member opposite to the rotor so as to constitute the motor section.

7. The method of manufacturing the power transmission device according to claim 6, wherein, after the stator assembling step, the motor section is started and a motor section inspecting step is performed to inspect the motor section.

8. The method of manufacturing the power transmission device according to claim 6, further comprising:
- a step of assembling the rotation detecting device carried out after the stator assembling the rotation detecting device carried out after the stator assembling step, wherein
  - the movable member of the rotation detecting device is assembled to the distal end side of the rotational shaft with respect to the first bearing in the cylindrical part via the first opening, and the detector of the rotation detecting device is attached to the inside of the cylindrical part via the first opening, and
  - a step adjusting phase of the assembled rotation detecting device.

9. A method of manufacturing an electric power steering device using the method of manufacturing the power transmission device defined in claim 6, wherein: the driven gear is a worm wheel gear attached to a side of the steering shaft, the driving gear is a worm gear engaged with the worm wheel gear, and the motor section is used for assisting steering drive, the motor section assisting rotation of the steering shaft by driving the worm wheel gear to rotate via the worm gear.

10. A method of manufacturing an electric power steering device using the method of manufacturing the power transmission device defined in claim 7, wherein: the driven gear is a worm wheel gear attached to a side of the steering shaft, the driving gear is a worm gear engaged with the worm wheel gear, and the motor section is used for assisting steering drive, the motor section assisting rotation of the steering shaft by driving the worm wheel gear to rotate via the worm gear.

11. A method of manufacturing an electric power steering device using the method of manufacturing the power transmission device defined in claim 8, wherein: the driven gear is a worm wheel gear attached to a side of the steering shaft, the driving gear is a worm gear engaged with the worm wheel gear, and the motor section is used for assisting steering drive, the motor section assisting rotation of the steering shaft by driving the worm wheel gear to rotate via the worm gear.

* * * * *

UNITED STATES PATENT AND TRADEMARK OFFICE
CERTIFICATE OF CORRECTION

| | | |
|---|---|---|
| PATENT NO. | : 7,243,569 B2 | Page 1 of 1 |
| APPLICATION NO. | : 10/469397 | |
| DATED | : July 17, 2007 | |
| INVENTOR(S) | : Masashi Takahashi | |

It is certified that error appears in the above-identified patent and that said Letters Patent is hereby corrected as shown below:

On the Cover Page:

On page two of the cover page, item (56) References Cited, Foreign Patent Documents, line 3, "JP 2-106657 8/1990" should be --JP 2-108657 8/1990--.

In Claim 1, column 10, line 8, after the word "bearing" the "." should be a --,--.

In Claim 1, column 10, line 13, after the word "member" the "." should be a --,--.

In Claim 6, column 10, line 57, the word "and" should be deleted.

In Claim 6, column 10, line 64, after the word "end" the "." should be a --,--.

In Claim 6, column 11, line 12, after the word "bearing" the "." should be a --,--.

In Claim 6, column 11, line 14, after the word "gear" the "." should be a --,--.

Signed and Sealed this

Eleventh Day of March, 2008

JON W. DUDAS
*Director of the United States Patent and Trademark Office*